C. SJÖGREN.
SPRING WHEEL.
APPLICATION FILED APR. 10, 1912.
1,034,524.
Patented Aug. 6, 1912.
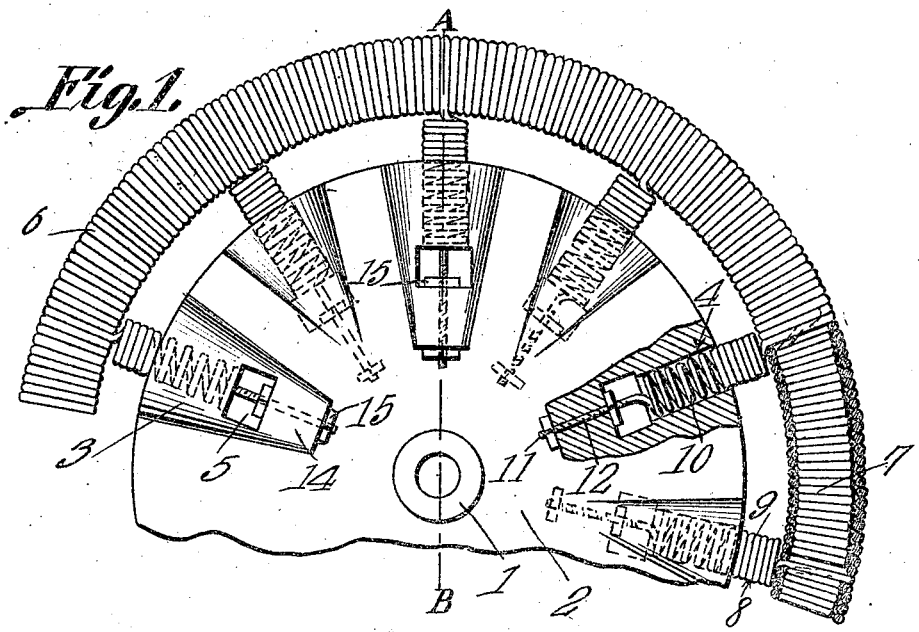
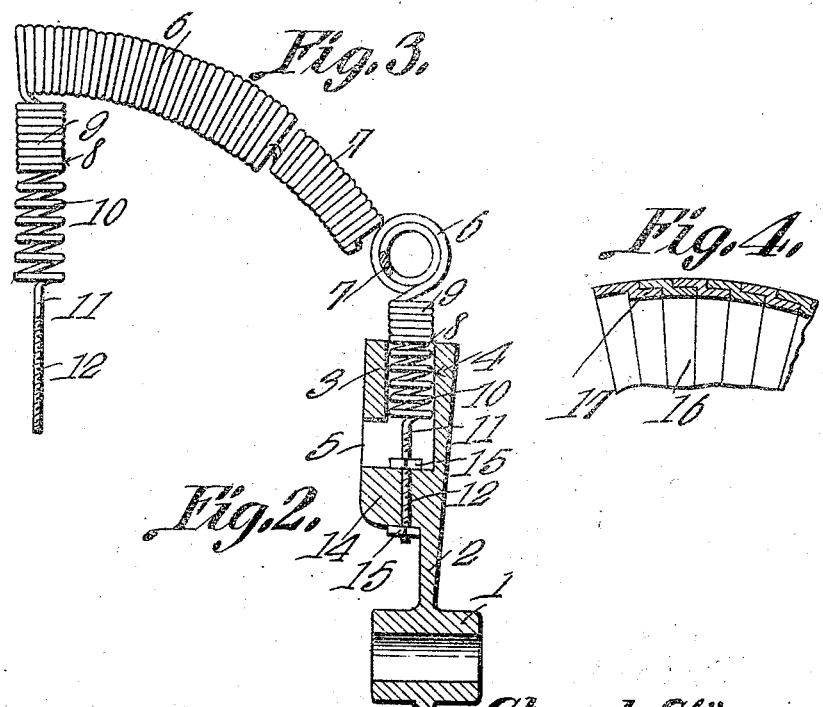
Charl Sjögren, Inventor
Witnesses

UNITED STATES PATENT OFFICE.

CHARL SJÖGREN, OF WESSINGTON SPRINGS, SOUTH DAKOTA.

SPRING-WHEEL.

1,034,524. Specification of Letters Patent. Patented Aug. 6, 1912.

Application filed April 10, 1912. Serial No. 689,840.

*To all whom it may concern:*

Be it known that I, CHARL SJÖGREN, a citizen of the United States, residing at Wessington Springs, in the county of Jerauld and State of South Dakota, have invented a new and useful Spring-Wheel, of which the following is a specification.

The device herein disclosed is adapted to be employed upon vehicles, for the purpose of dispensing with pneumatic tires, and with this end in view, one object of the invention is to provide a tire which is composed of helical springs, the end of one spring being inserted into the end of an adjoining spring in telescoping relation, thus to resist relative lateral movement between the springs and to enhance the resiliency of the tire.

A further object of the invention is to provide as an article of manufacture, a combined tire-forming and spoke-forming element which may be fashioned at trifling cost, to afford the desired resiliency both in the tire and in the spoke.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a sectional side elevation of a portion of a wheel constructed in accordance with the present invention; Fig. 2 is a radial section upon the line A—B of Fig. 1; Fig. 3 is a side elevation of one of the combined tire and spoke-forming elements; and Fig. 4 is a fragmental section showing a modified form of invention.

In the accompanying drawings, the rigid portion of a wheel is shown, and it is to be understood that the rigid portion of the wheel may be fashioned in any desired manner. For the sake of illustration, the rigid portion of the wheel is shown as comprising a hub 1 from which projects a spoke plate 2 provided with laterally extended ribs 3 having radial sockets 4. There are openings 5 in the ribs 3 and the sockets 4 communicate with the openings 5.

The invention further includes a helical spring 6, the convolutions of which are diminished in diameter adjacent one end of the spring to form an extension 7. The final convolution at the larger end of the spring 6 is fashioned into a spoke-forming helical spring 8. Those convolutions of the spring 8 which are adjacent the spring 6 are close together and preferably in contact as indicated at 9. Owing to the fact that the convolutions 9 are in contact, the portion 9 of the spring 8 is adapted to resist expansion, yieldingly. Those convolutions of the spring 8 which are adjacent to the free extremity of the spring are spaced apart slightly as indicated at 10. The convolutions 10 are adapted to resist compression, yieldingly. The final convolution of the portion 10 of the spring 8 terminates in a finger 11 which is threaded as indicated at 12. The extension 7 of one spring is adapted to fit closely within the body portion 6 to the next adjoining spring, the relative diameters of the convolutions 6 and 7 being such that the spring about its periphery will present an unbroken tread surface. The spoke-forming springs 8 seat in the sockets 4, the spring fingers 11 passing through the shoulders 14 in the ribs 3 which lie between the opening 5 and the hub 1. Nuts 15 are applied to the threaded ends 12 of the spring 8 and engage the inner and outer faces of the shoulder 14.

It may be seen that the spring element may be removed readily from the wheel and with equal facility be replaced by another similar element. The device, as shown in Fig. 3, comprises in a one-piece structure, a tire-forming helical spring and a radially disposed spoke-forming helical spring adapted for connection with the hub portion of the wheel.

The spring 6, its extension 7, the spring 8 and the finger 11 are fashioned from a single bar of material. The bar is so shaped that the convolutions of the resilient elements 6 and 7 will be slightly wider adjacent the tread portion of the tire than adjacent the inner circumference thereof, so that there will be no spaces between the convolutions of the respective elements 6 and 7. That portion of the rod or bar which enters into the construction of the spring 8 is of a common diameter it being desirable that the spring 8 shall be in the form of a cylinder the axis of which is straight from end to end.

If desired, the device may be fashioned from a bar of flat metal, and under such circumstances the convolutions of the portions 6 and 7 will appear as shown at 16 in Fig. 4, each convolution 16 being recessed along one edge as shown at 17 to form a shoulder against which the edge of the next adjacent convolution is adapted to abut.

Having thus described the invention, what is claimed is:—

1. As an article of manufacture, a tire-forming helical spring of greater diameter at one end than at the other end; and a spoke-forming helical spring projecting from the larger end of the tire-forming spring.

2. As an article of manufacture, a tire-forming helical spring of greater diameter at one end than at the other end; and a spoke-forming helical spring projecting from the larger end of the tire-forming spring, the spoke-forming spring having certain of its convolutions in contact to resist expansion, and having others of its convolutions spaced apart to resist compression.

3. As an article of manufacture, a tire-forming helical spring of greater diameter at one end than adjacent the other end; and a spoke-forming helical spring projecting from the larger end of the tire-forming spring, all of the springs being fashioned from a single strip of material.

4. As an article of manufacture, a tire-forming helical spring of greater diameter at one end than at the other end; and a spoke-forming helical spring projecting from the larger end of the tire-forming spring; the lines of contact between adjacent convolutions of the tire-forming spring converging toward a common point, and the adjacent edges of the convolutions of the spoke-forming spring being parallel.

In testimony that I claim the foregoing as my own, I have hereto affixed my signature in the presence of two witnesses.

CHARL SJÖGREN.

Witnesses:
CHAS. R. HATCH,
CHAS. W. MILLER.